(12) United States Patent
Horii et al.

(10) Patent No.: US 7,921,947 B2
(45) Date of Patent: Apr. 12, 2011

(54) SADDLE RIDING TYPE FUEL CELL VEHICLE

(75) Inventors: Yoshiyuki Horii, Saitama (JP); Masamoto Ito, Saitama (JP); Shinji Furuta, Saitama (JP); Atsuko Niwano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 378 days.

(21) Appl. No.: 12/145,991

(22) Filed: Jun. 25, 2008

(65) Prior Publication Data

US 2009/0000837 A1   Jan. 1, 2009

(30) Foreign Application Priority Data

Jun. 29, 2007 (JP) ................................. 2007-172504

(51) Int. Cl.
*B60L 11/18* (2006.01)

(52) U.S. Cl. .................... 180/65.31; 180/68.4; 180/210; 429/26

(58) Field of Classification Search ........ 180/65.1–65.3, 180/68.1–68.46, 210, 219–220, 229, 903, 180/908; 429/26; *B60L 11/18; B60K 11/04*
See application file for complete search history.

(56) References Cited

U.S. PATENT DOCUMENTS

| | | | |
|---|---|---|---|
| 5,992,554 A * | 11/1999 | Hasumi et al. ................ | 180/229 |
| 6,011,378 A | 1/2000 | Tabata et al. | |
| 7,358,003 B2 * | 4/2008 | Imaseki et al. ................ | 429/435 |
| 7,484,582 B2 * | 2/2009 | Iwashita et al. .............. | 180/65.1 |
| 2002/0005305 A1 * | 1/2002 | Hirayama et al. ........... | 180/68.5 |
| 2004/0035623 A1 * | 2/2004 | Fecteau et al. ............... | 180/210 |
| 2004/0140140 A1 | 7/2004 | Guay et al. | |
| 2007/0092764 A1 * | 4/2007 | Kobayashi ...................... | 429/9 |
| 2007/0256882 A1 * | 11/2007 | Bedard et al. ................ | 180/312 |

FOREIGN PATENT DOCUMENTS

| | | |
|---|---|---|
| EP | 1 860 718 A2 | 11/2007 |
| JP | 2001-130468 A | 5/2001 |
| JP | 2006-56427 A | 3/2006 |

\* cited by examiner

*Primary Examiner* — J. Allen Shriver, II
*Assistant Examiner* — James Triggs
(74) *Attorney, Agent, or Firm* — Birch, Stewart, Kolasch & Birch, LLP (57) ABSTRACT

A saddle riding type fuel cell vehicle includes a fuel cell that generates power by a chemical reaction between a fuel gas and a reactive gas with radiators that cool cooling water of the fuel cell. The radiators are adjacently arranged in right and left sides of the fuel cell in a vehicle width direction. Each outer end surface of the radiators, outside in a vehicle width direction, is positioned closer to the front side of a vehicle body than each inner end surface inside in the vehicle width direction. Thus, each plane portion, which receives an air flow, is inclined to the inner side of the vehicle body, and air courses, which allow an air flow to be passed to the rear side of the vehicle body, are each formed between the inner end surface of each of the radiators and each side surface of the fuel cell.

16 Claims, 6 Drawing Sheets

SADDLE RIDING TYPE FUEL CELL VEHICLE

CROSS-REFERENCE TO RELATED APPLICATIONS

The present application claims priority under 35 USC 119 to Japanese Patent Application No. 2007-172504 filed on Jun. 29, 2007 the entire contents of which are hereby incorporated by reference.

BACKGROUND OF THE INVENTION

1. Field of the Invention

The present invention relates to a saddle riding type fuel cell vehicle. More particularly, to a saddle riding type fuel cell vehicle capable of reducing pressure loss by shortening a cooling water pipe and improving the cooling effect of a fuel cell.

2. Description of Background Art

A fuel cell vehicle is known that travels with electric power supplied from a fuel cell being mounted thereon and generating electricity through a chemical reaction between hydrogen as a fuel gas and oxygen contained in a reactive gas (air). Although an internal temperature of the fuel cell rises due to the heat of the chemical reaction during its operation, the temperature of the fuel cell must be kept within a predetermined range in order to perform the chemical reaction efficiently. To this end, the fuel cell vehicle is provided with a cooling system for cooling the fuel cell.

Japanese Patent Application Publication No. 2006-56427 discloses a saddle riding type fuel cell two-wheeled vehicle with water-cooling type radiators mounted on a front side of a vehicle body. In this vehicle, a contrivance is made such that a first radiator is provided at the front of a head pipe and a second radiator is provided at the rear of a front wheel. Thus, the radiators receive the traveling up-flow of air from the front of the vehicle body in a large quantity. Thus, heat dissipation efficiency improves accordingly.

However, in the structure disclosed in Japanese Patent Application Publication No. 2006-56427, there is a long distance between each of the radiators and the fuel cell, which is provided substantially at the center in a vehicle body front-rear direction. Therefore, a cooling water pipe tends to be long. As a result, a piping structure is complicated, and enlargement of the pump for pressure-feeding cooling water is sometimes necessary when pressure loss increases due to piping.

SUMMARY AND OBJECTS OF THE INVENTION

An object of an embodiment of the present invention is to provide a saddle riding type fuel cell vehicle which solves the aforementioned problem of the conventional technique, and which is capable of reducing pressure loss by shortening a cooling water pipe and improving the cooling effect of a fuel cell.

In order to achieve the above object, an embodiment of the present invention provides a saddle riding type fuel cell vehicle that includes a fuel cell that generates electric power through a chemical reaction between a fuel gas and a reactive gas with radiators that cool cooling water of the fuel cell, wherein the radiators are adjacently placed respectively on right and left sides, in a vehicle width direction, of the fuel cell.

According to an embodiment of the present invention lies in that each of the radiators has a plane portion that receives an air flow wherein the plane portion is placed to be inclined to a vehicle body inner side from a state of being directed to a front of the vehicle body.

According to an embodiment of the present invention, each radiator is placed such that at least a part of the front side of the vehicle body is overlapped with a rear portion of the fuel cell in a vehicle body side view.

According to an embodiment the present invention, the saddle riding type fuel cell vehicle is a three-wheeled vehicle equipped with two rear wheels separated from each other in a vehicle width direction. Each of the radiators is placed closer to the center of the vehicle body than an outer end surface of a corresponding one of the rear wheels in the vehicle width direction.

According to an embodiment of the present invention, each of the radiators is placed adjacently on each of right and left sides of the fuel cell in a vehicle width direction. Accordingly, the fuel cell and each of the radiators are arranged close to each other. Thus, it is possible to reduce pressure loss in a pipe because only a short cooling water pipe is required. Moreover, miniaturization of a cooling water pump can be achieved by shortening the pipe. As a result, mounting workability can be improved because a setting space is easily secured. Further, the radiators are arranged close to the fuel cell and near the center of the vehicle body, so that centralization of a mass of the vehicle can be achieved. Furthermore, as compared with the structure in which the radiators are arranged on a vehicle body front side, a setting space is easily secured. Thus, enlargement of the radiators can be easily achieved.

According to an embodiment of the present invention, each of the radiators has a plane portion that receives an air flow and the plane portion is inclined to the vehicle body inner side from a position directed to the front of the vehicle body. Therefore, the right and left radiators are capable of functioning as air guide plates that guide traveling wind in a vehicle body inner direction. As a result, the air flow is positively guided between each of the radiators and the fuel cell to form air courses between the radiator and the fuel cell. Thus, the air flow directly hits a side surface of the fuel cell, thereby enabling improvement in the cooling effect of the fuel cell.

According to an embodiment of the present invention, each of the radiators is placed such that at least a part of the front side of the vehicle body is overlapped with a rear portion of the fuel cell in a vehicle body side view. Therefore, the air flow can hit the entire side surface of the fuel cell, as compared with the structure in which the radiators are arranged near the front of the fuel cell.

According to an embodiment of the present invention, the saddle riding type fuel cell vehicle is a three-wheeled vehicle equipped with two rear wheels separated from each other in a vehicle width direction. Each of the radiators is arranged closer to the vehicle body inner side than an outer end surface of each of the rear wheels in the vehicle width direction. Thus, the protection of the radiators can be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
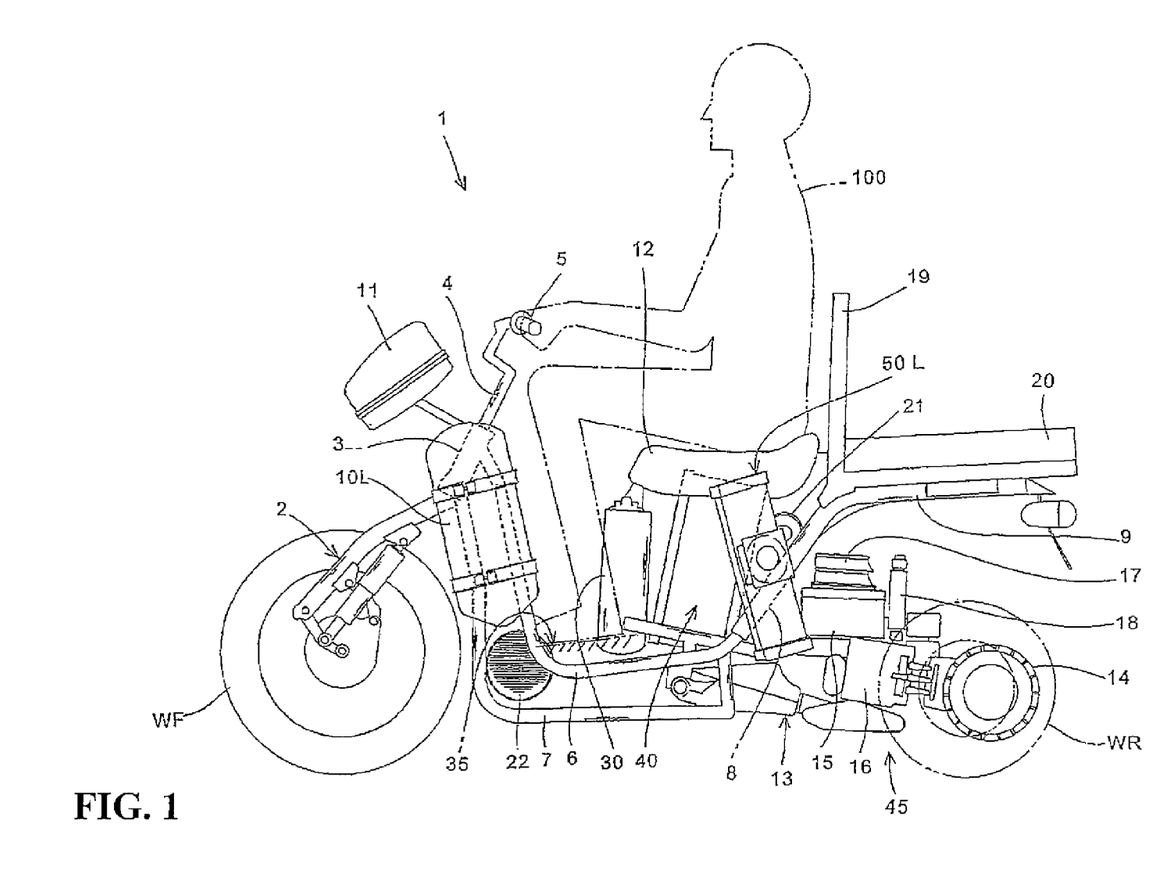
FIG. 1 is a side view of a saddle riding type fuel cell vehicle according to one embodiment of the present invention.
Figure 2:
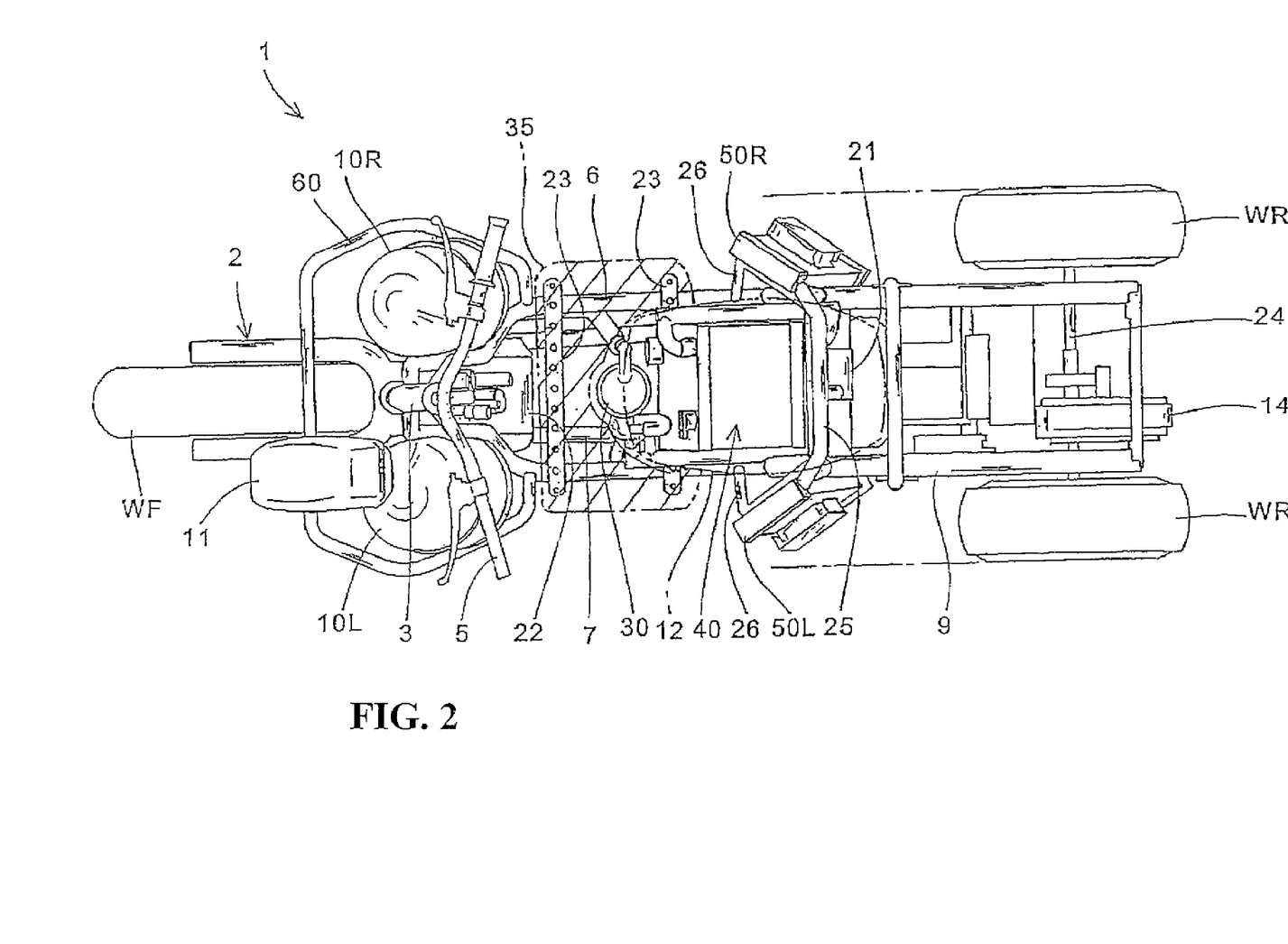
FIG. 2 is a top view of the saddle riding type fuel cell vehicle according to one embodiment of the present invention.

The following will specifically explain a preferred embodiment of the present invention with reference to the drawings. FIGS. 1 and 2 are a side view and a top view, respectively, showing a saddle riding type fuel cell vehicle 1 according to one embodiment of the present invention. The saddle riding type fuel cell vehicle 1 according to the present embodiment is a three-wheeled vehicle equipped with one front wheel WF as a steering wheel and two rear wheels WR as driving wheels separated in a vehicle width direction, and includes a scooter type vehicle structure provided with a low-floor type footrest portion between a steering handle and a sitting seat. The saddle riding type fuel cell vehicle 1 includes a fuel cell power generation system that is composed of a cell stack having multiple cells stacked to form a fuel cell with a fuel (hydrogen) gas supply system that supplies hydrogen gas as a fuel to the cell stack. A reactive gas supply system is provided that supplies reactive gas (air) containing oxygen to the cell stack. The saddle riding type fuel cell vehicle 1 is operated by driving a drive motor with power generated by the fuel cell and power supplied from a secondary cell that stores the generated power.

A steering system 4 that supports a bottom link type front suspension 2 is pivotably supported by a head pipe 3 that is positioned at a front end of a vehicle frame. The front wheel WF as a steering wheel is pivotably supported by a lower end portion of the front suspension 2. The front wheel WF can be steered by a steering handle 5 connected to the steering system 4. A pair of right and left main frames 6 is connected to the head pipe 3 to extend in a downward rearward direction, and bends largely at a lower portion of a vehicle body to extend to a vehicle body rear side. A pair of right and left under frames 7, each having a shape along the main frame 6, is provided under the main frames 6. Similar to the frames 6, the under frames 7 are connected to the head pipe 3 to extend in the downward back direction, and bends largely at the lower portion of the vehicle body to extend to the vehicle body rear side. A rear end of each under frame 7 largely bends upward and is connected to each main frame 6, while the main frame 6 is connected to a rising frame 8 on the vehicle body rear side. Each rising frame 8 is coupled to a rear frame 9 that supports a carrier 19, while a secondary cell 20 that stores power generated by a fuel cell 40 is mounted on the carrier 19.

Under a seat 12 on which a driver 100 sits, the rectangular fuel cell 40 is provided with an inclination of a predetermined angle (for example 30 degrees) toward the vehicle body rear side. Water-cooling type radiators 50L and 50R for cooling the fuel cell 40 are arranged on the right and left sides of the fuel cell 40 in the vehicle width direction. Moreover, an electric pump 21 for pressure-feeding cooling water of the radiators is provided on a rear surface side of the fuel cell 40. On the other hand, an approximately cylindrical humidifier 30 is provided on a front surface side at substantially the center in the vehicle width direction. A low-floor type footrest portion 35 is provided between the seat 12 and the steering handle 5. The footrest portion 35 is a flat floor surface, which is formed of a resin plate and the like, and on which the driver's feet are placed during the travel of the vehicle. In the present embodiment, the footrest portion 35 is symmetrically shaped in the vehicle width direction. At a front lower portion of the footrest portion 35 and in a space surrounded with the main frames 6 and the under frames 7, there is provided a supercharger 22 for pressure-feeding reactive gas to the fuel cell 40. Stays 23 for supporting the resin plate that forms the footrest portion 35 are provided on the upper surfaces of the main frames 6 of the vehicle body and in front and rear of the humidifier 30.

The rear wheels WR and a drive motor 14 that drives them are attached to a power unit 45 provided at the rear portion of the vehicle body. The power of the drive motor 14 is transmitted to two rear wheels WR by an axle 24 via a gear mechanism. The power unit 45 is coupled to the vehicle frames by a coupling mechanism 13, and is hung on the vehicle body side by a shock unit (not shown). A Neidhart swing mechanism using a rubber bumper is applied to the coupling mechanism 13. This mechanism makes it possible to incline the vehicle body right and left with two rear wheels being in contact with the ground surface for providing turning and traveling. The power unit 45 includes electric parts such as a voltage conversion unit (VCU) 15, a driver 16 for a drive motor, a DC-DC converter 17, an ECU 18 as a control unit, etc.

A pair of right and left hydrogen cylinders 10L and 10R is provided on the right and left sides of the head pipe 3 in the vehicle width direction, so as to hold the main frames 6 and the under frames 7 from the right and left sides. The front and rear of the hydrogen cylinders 10L and 10R are coupled to the main frames 6, and are surrounded with a guard pipe 60 (see FIG. 2) that protects them from the outside. Furthermore, an air cleaner box 11 for filtering outside air (air) as a reactive gas is provided at an upper position ahead of the left hydrogen cylinder 10L.

The radiators 50L and 50R are arranged adjacent to each other so as to hold the fuel cell 40 from the right and left sides in the vehicle width direction. With this structure, as compared with the case in which the radiators and the fuel cell are provided at positions separated from each other, a cooling water pipe may be short to allow a reduction in pressure loss in the pipe. The radiators 50L and 50R are arranged such that their upper portions are tilted more to the front of the vehicle body than their lower portions, in a vehicle body side view. The plane parts or the radiators 50L and 50R receive an air flow, are tilted to the inner side of the vehicle body, in a vehicle body top view. Furthermore, the radiators 50L and 50R are arranged on a vehicle body inner side from outer end portions of the rear wheels WR in the vehicle width direction, so that even if an object and the like come close to the radiators, the rear wheels contact the object first to allow protection of the radiators. At a rear upper portion of the fuel cell 40, there is provided a distribution pipe 25 that distributes cooling water pressure-fed from the electric pump 21 to the right and left radiators 50R and 50L.

Figure 6:
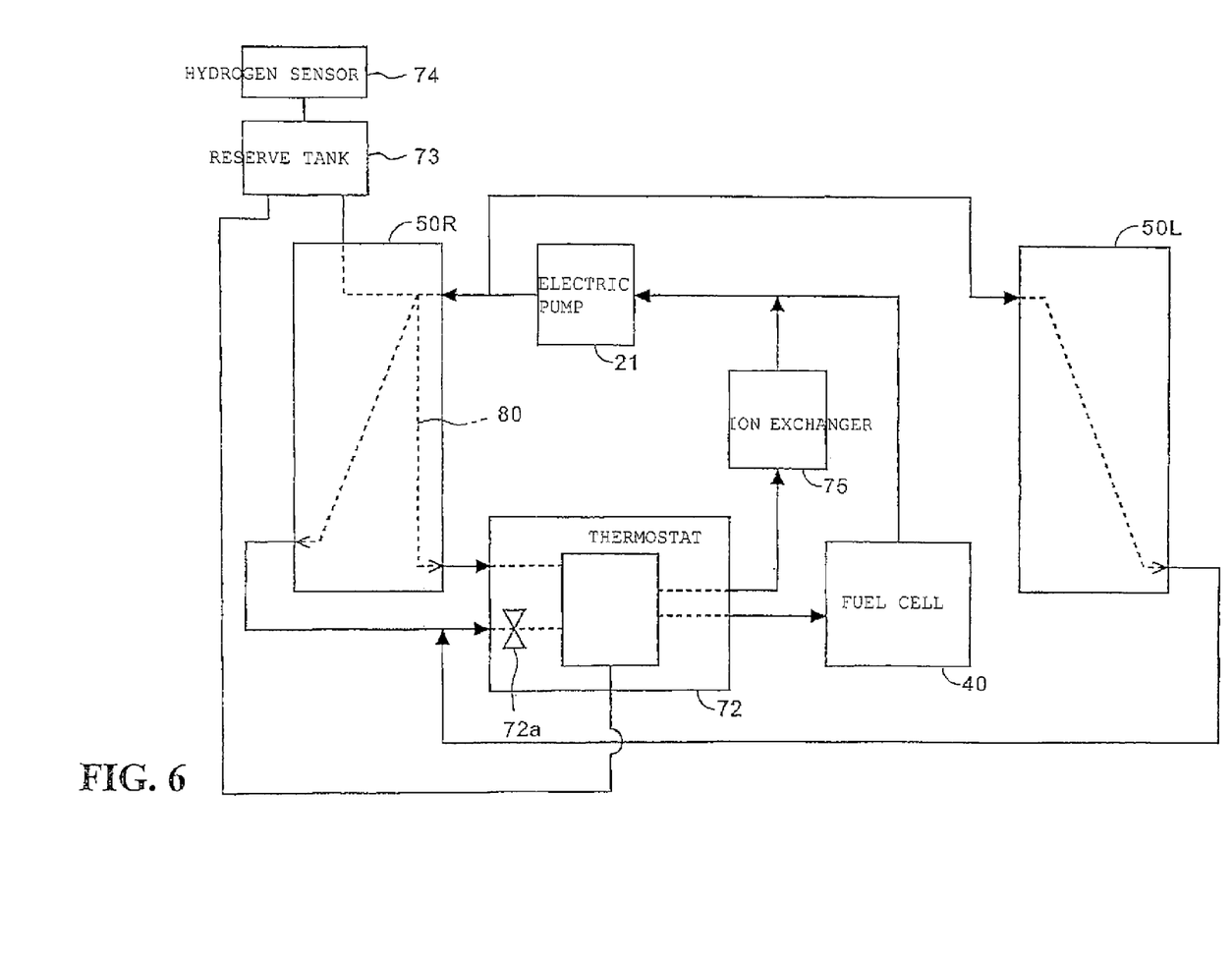
FIG. 6 is a block diagram showing the structure of a cooling system.

FIG. 6 is a block diagram showing a structure of a cooling system according to the present embodiment. The heat of the cooling water pressure-fed by the electric pump 21 is radiated by the radiators 50L and 50R, and the cooling water is sent to a thermostat 72. A valve 72*a* of the thermostat 72 is opened when a temperature of the cooling water is a predetermined value or higher. Accordingly, the cooling water cooled by the radiators 50L and 50R is sent to the fuel cell 40 and an ion exchanger 75. On the other hand, when a temperature of the cooling water is lower than a predetermined value, the valve 72*a* is closed to prevent supercooling of the fuel cell 40. Accordingly, the cooling water pressure-fed by the electric pump 21 is returned to the thermostat 72 via a bypass 80 provided at the side portion of the radiator 50R. The ion exchanger 75, through which cooling water always passes during the operation of the electric pump 21, is a device that removes a predetermined ion to suppress electric conductivity of the cooling water to a low level. A cooling water reserving tank 73 is provided at an upper portion of a rear surface side of the fuel cell 40, connected to the radiator 50R and also connected to the thermostat 72 by a thin pipe for bleeding air. In addition, the reserve tank 73 is provided with a hydrogen sensor 74 for detecting hydrogen leaked in the cooling water.

In the present embodiment, the radiators 50L and 50R are adjacently arranged on the right and left sides of the fuel cell 40 in the vehicle width direction and the structural parts of the aforementioned cooling system are collectively arranged around the fuel cell 40. Accordingly, the length of the pipe is shortened in the entire cooling system to allow a reduction in pressure loss in the pipe. Moreover, the cooling system is disposed near the center of the vehicle, so that centralization of a mass of the vehicle can be achieved.

Figure 3:
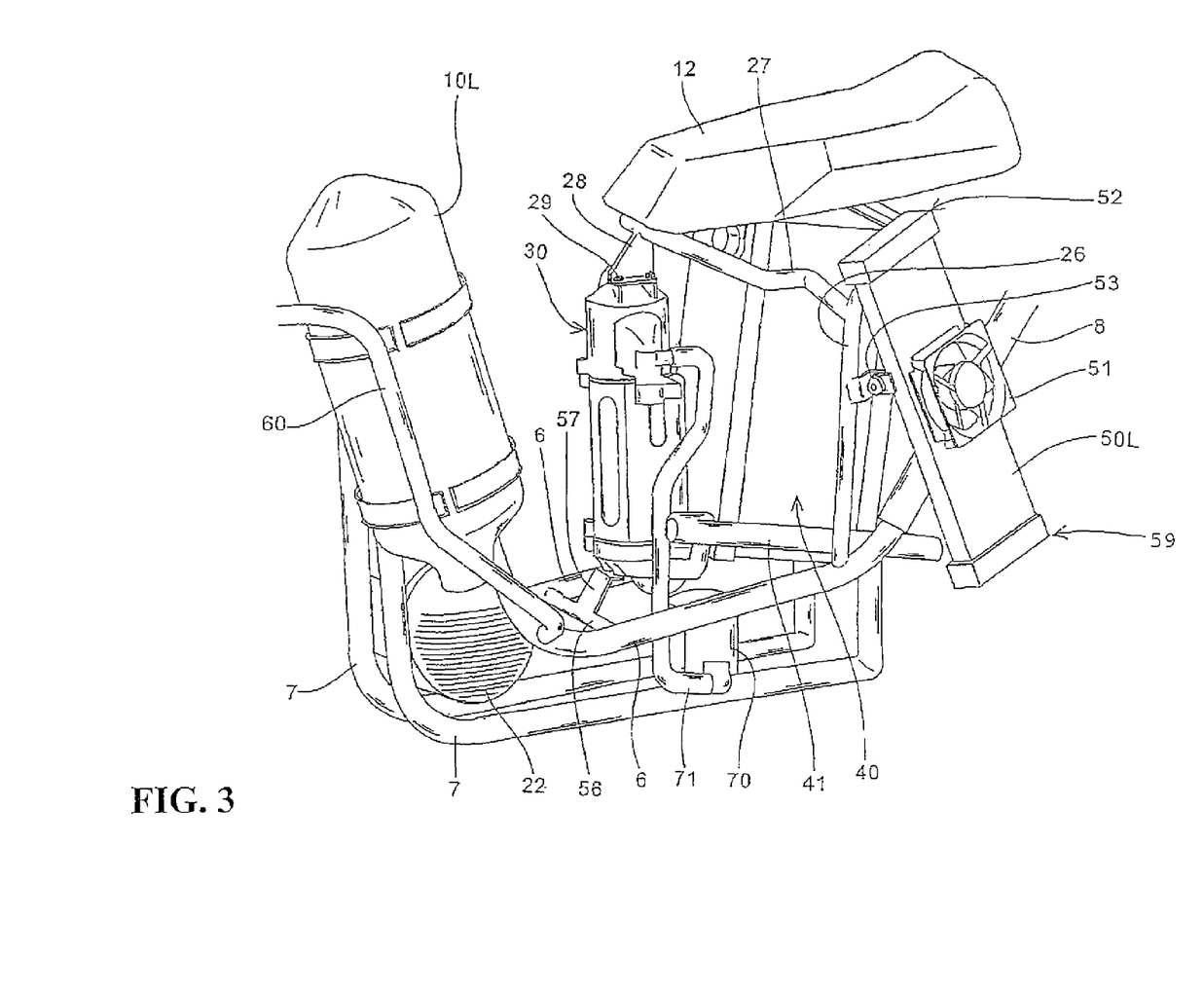
FIG. 3 is a perspective view of a left side surface of the saddle riding type fuel cell vehicle according to one embodiment of the present invention.

FIG. 3 is a partially expanded perspective view of the saddle riding type fuel cell vehicle 1, as seen from a left side surface. In this drawing, the same reference numerals as those described above indicate the same or equivalent parts as those described above. The fuel gas and the reactive gas supplied to the fuel cell 40 are exhausted, as an unreacted gas and product water, to the outside of the fuel cell 40 after a chemical reaction in the cell stack. An exhaust-side manifold 41, which exhausts an unreacted gas and product water, is provided at a lower portion of the fuel cell 40 of the present embodiment on the left side in the vehicle width direction. An unreacted gas containing sufficient water is introduced from the lower portion of the humidifier 30 to its interior. Then, the unreacted gas is guided, through a pipe 71, to a dilution box 70 after water is supplied to a reactive gas that is newly introduced from outside air (air) in the interior of the humidifier 30. An unreacted gas from which residual hydrogen is removed by the dilution box 70 is discharged to atmosphere from an exhaust pipe (not shown) provided on the vehicle rear side.

The humidifier 30 of an approximately cylindrical shape is provided between the seat 12 and the main frames 6 such that its longitudinal direction is set to a vehicle body up-down direction, that is, a vertical direction. The upper portion of the humidifier 30 is fastened to a plate-like bracket 28, which is jointed to a seat frame 27 that supports the seat 12, by two mounting bolts 29. On the other hand, the lower portion of the humidifier 30 is fastened to a plate-like bracket 57 jointed to a coupling pipe 56 in the vehicle width direction, which couples the right and left main frames 6, by the similar mounting bolts (not shown). In this way, according to the present embodiment, the humidifier 30 is provided such that the seat frame 27 and the main frames 6 are coupled to each other, and therefore the humidifier 30 is used as a part of the vehicle body frames, thereby allowing a reduction in the number of frame structural members while keeping the rigidity of the vehicle.

In the vicinity of the coupling portion of the main frames 6 and the rising frames 8, a radiator mounting stay 26, which extends upward, is jointed, and the radiators 50L and 5OR are respectively attached to mounting portions 53 provided on the radiator mounting stay 26. Moreover, the seat frame 27, which supports the seat 12, is also jointed to the radiator mounting stay 26. Electric cooling fans 51, each of which forcibly generates a flow of air to obtain the cooling effect even while the vehicle is stopped, are each attached to the radiators 50L and 50R. Each of the radiators 50L and 50R is inclined and attached to the vehicle, and a rear end portion 52 of its upper surface is placed at a position higher than the fuel cell 40. Moreover, a rear end portion 59 of the lower surface of each of the radiators is placed more rearwardly than the fuel cell 40.

Figure 4:
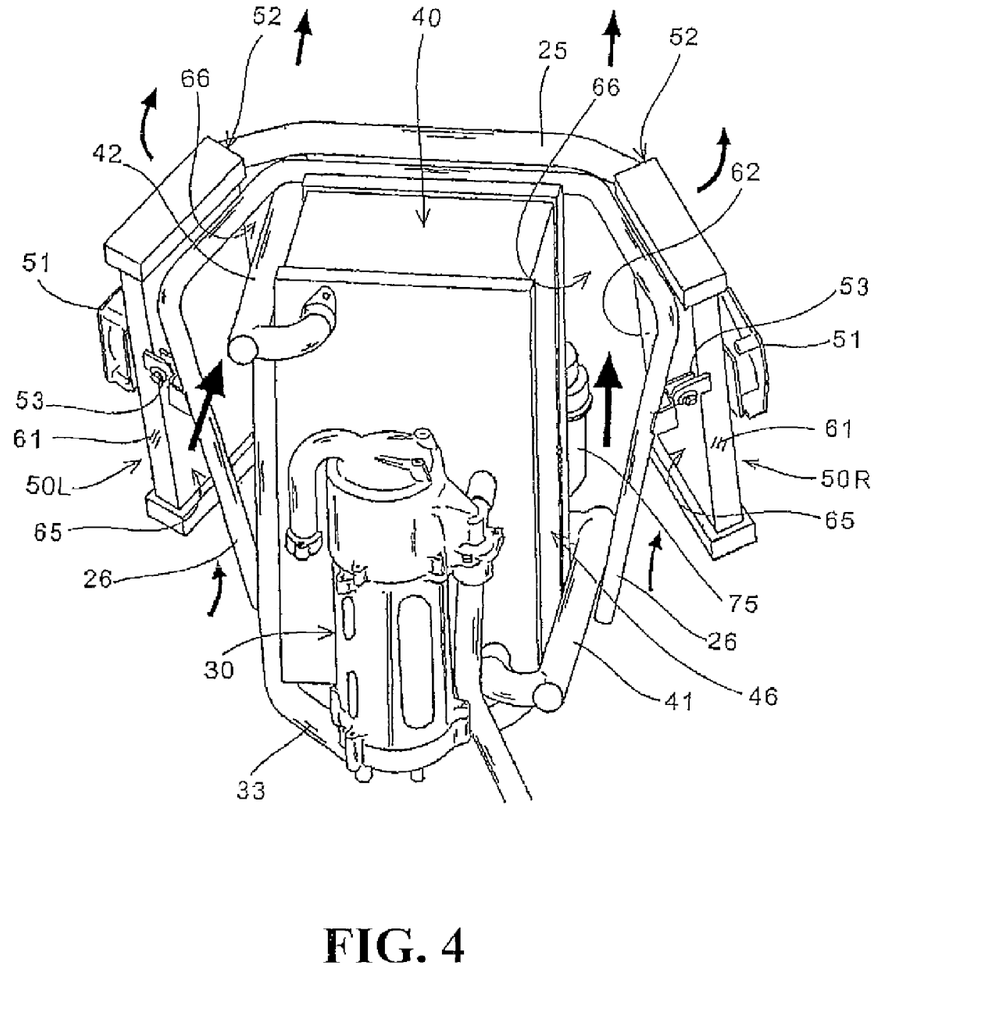
FIG. 4 is a perspective view showing an arrangement relation between a fuel cell and radiators.

FIG. 4 is a perspective view showing an arrangement relation between the fuel cell and the radiators. This figure shows a state seen from a front side of the vehicle body, and parts unnecessary for explanation are appropriately omitted. According to the structure in which the radiators 50L and 50R are arranged on the right and left sides of the fuel cell 40 in the vehicle width direction as in the present embodiment, it is easy to secure a setting space and enlarge the radiators, as compared with the structure in which the radiators are arranged on the vehicle body front side. The radiator mounting stay 26, to which the radiators 50L and 50R are attached, is formed of one pipe member with multiple curves, and has right and left widths expanding upward as well as encloses an upper rear portion of the fuel cell 40. Accordingly, in addition to fixing both the radiators to predetermined positions, the radiator mounting stay 26 is given a function for protecting the fuel cell 40 as well as both the exhaust-side manifold 41 and an intake-side manifold 42 which are attached to the fuel cell 40. In additional, the reactive gas passed through the humidifier 30 is guided upward through a pipe 33 that is coupled to the lower portion of the humidifier 30, and is supplied to the fuel cell 40 through the intake-side manifold 42. The ion exchanger 75 is provided under the electric pump 21 (see FIG. 1) at the rear surface of the fuel cell 40.

The radiators 50L and 50R are approximately rectangular plate-like members each having a thickness corresponding to a thickness of a cooling core, and each outer end surface 61 outside in the vehicle width direction is positioned closer to the vehicle body front side than each inner end surface 62 inside in the vehicle width direction, so that each plane portion 65, which receives a flow of air, is inclined to the vehicle body inner side. Then, air courses 66, which allow the flow of air to be passed to the rear side of the vehicle body, are each formed between the inner end surface 62 of each of the radiators and each side surface 46 of the fuel cell 40.

According to the aforementioned structure, both the radiators function as air guide plates for the flow of air, and the flow of air is positively guided to the air course 66. As a result, the traveling wind directly hits both the side surfaces 46 of the fuel cell 40, thereby enabling improvement in the cooling effect of the fuel cell. Moreover, in a vehicle side view, the rear end portions 59 of the lower surfaces of both the radiators are positioned at the rear of the fuel cell 40, and the front sides of both the radiators are arranged to be overlapped with the fuel cell 40. Therefore, for example, as compared with the structure in which both of the radiators are arranged on the front side of the fuel cell 40, the entire side surface 46 comes in contact with the air course 66 to make it possible to further improve the cooling effect.

Figure 5:
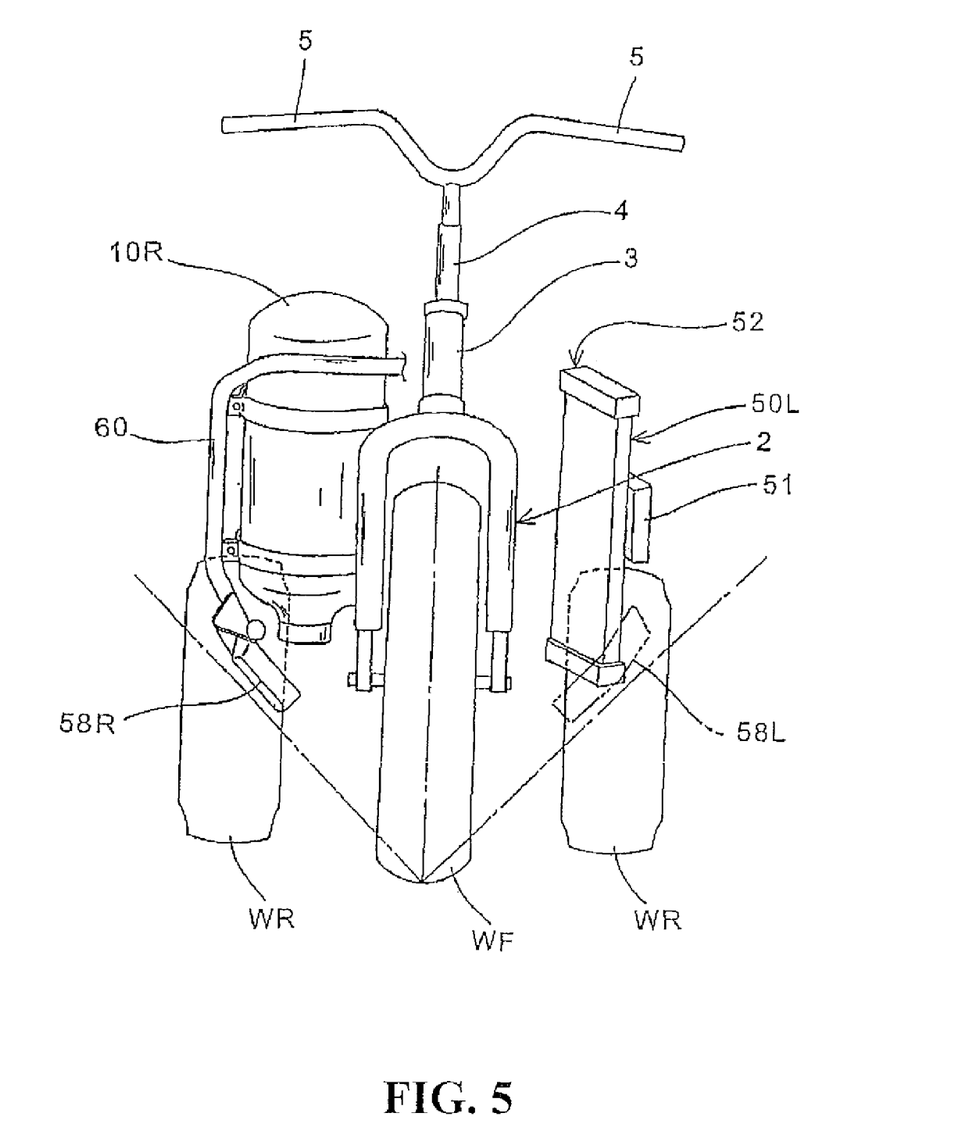
FIG. 5 is a schematic view showing a radiator arrangement structure.

FIG. 5 is a schematic view showing a radiator arrangement structure. In FIG. 5, the same reference numerals as those described above indicate the same or equivalent parts as those described above. FIG. 5 shows a state seen from a front side of the saddle riding type fuel cell vehicle 1, and parts unnecessary for explanation are appropriately omitted. As shown in FIG. 2, the radiators 50L and 50R are arranged closer to the vehicle body inner side than the outer end surfaces of the rear wheels WR. Moreover, when a vehicle bank angle exceeds a predetermined value (for example, 45 degrees) shown by an alternate long and short dash line, sliders 58L and 58R, which come in contact with a road surface, are provided under a guard pipe 60 that protects the hydrogen cylinders 10L and 10R. Then, the radiators 50L and 50R are arranged above the sliders 58L and 58R and closer to the vehicle body inner side. Thus, it is possible to place the radiators within the bank angle of the vehicle body and protect the radiators.

As mentioned above, according to the saddle riding type fuel cell vehicle of the present embodiment, the radiators 50L and 50R are adjacently arranged on the right and left sides of the fuel cell 40 in the vehicle width direction. Therefore, as compared with the case in which the radiators and the fuel cell are provided at positions separated from each other, the pipe of cooling water may be short to allow a reduction in pressure loss in the pipe. Furthermore, the air course 66 is formed between each of the radiators 50L and 50R and the fuel cell 40, thereby making both the radiators function as air guide plates to guide the flow of air to the vehicle body inner side. Thus, the fuel cell 40 can be cooled because the flow of air directly hits both the side surfaces 46.

The shape of the right and left radiators and that of the guard pipe of the fuel cell, the arrangement relation between the fuel cell and the radiators, the shape of the air courses, the structure of the cooling system, and the like can be variously changed without being limited to the aforementioned embodiment. For example, regarding the form of the radiators, the contour may be a trapezoid and the like, and the plane portion that the traveling wind hits may be curved. Moreover, the saddle riding type fuel cell vehicle may be a two-wheeled vehicle/four-wheeled vehicle, and exterior parts of various shapes that cover around the radiators may be attached to the vehicle body.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle riding type fuel cell vehicle, comprising:
    a fuel cell for generating electric power through a chemical reaction between a fuel gas and a reactive gas; and
    radiators for cooling a cooling water in communication with the fuel cell;
    wherein the radiators are adjacently placed respectively on right and left sides, in a vehicle width direction, of the fuel cell, and are arranged to be open to a front side portion of the vehicle, in order to provide air courses between an inner end surface of each of the radiators and the right and left sides of the fuel cell, which allow a flow of air to be passed to a rear side of the vehicle.

2. The saddle riding type fuel cell vehicle according to claim 1, wherein each of the radiators has a plane portion for receiving a flow of air and the plane portion is placed to be inclined to a vehicle body inner side from a state of being directed to a front of the vehicle body.

3. The saddle riding type fuel cell vehicle according to claim 1, wherein at least a part, on the front side of the vehicle body, of the radiators is overlapped with a rear portion of the fuel cell in a vehicle body side view.

4. The saddle riding type fuel cell vehicle according to claim 2, wherein at least a part, on the front side of the vehicle body, of the radiators is overlapped with a rear portion of the fuel cell in a vehicle body side view.

5. The saddle riding type fuel cell vehicle according to claim 1, wherein the saddle riding type fuel cell vehicle is a three-wheeled vehicle equipped with two rear wheels separated from each other in a vehicle width direction, and each of the radiators is placed closer to the center of the vehicle body than an outer end surface of a corresponding one of the rear wheels in the vehicle width direction.

6. The saddle riding type fuel cell vehicle according to claim 2, wherein the saddle riding type fuel cell vehicle is a three-wheeled vehicle equipped with two rear wheels separated from each other in a vehicle width direction, and each of the radiators is placed closer to the center of the vehicle body than an outer end surface of a corresponding one of the rear wheels in the vehicle width direction.

7. The saddle riding type fuel cell vehicle according to claim 3, wherein the saddle riding type fuel cell vehicle is a three-wheeled vehicle equipped with two rear wheels separated from each other in a vehicle width direction, and each of the radiators is placed closer to the center of the vehicle body than an outer end surface of a corresponding one of the rear wheels in the vehicle width direction.

8. The saddle riding type fuel cell vehicle according to claim 4, wherein the saddle riding type fuel cell vehicle is a three-wheeled vehicle equipped with two rear wheels separated from each other in a vehicle width direction, and each of the radiators is placed closer to the center of the vehicle body than an outer end surface of a corresponding one of the rear wheels in the vehicle width direction.

9. The saddle riding type fuel cell vehicle according to claim 1, further comprising:
    a radiator mounting stay formed of one pipe member with multiple curves, to which at least one of the radiators is attached,
    wherein an upper rear of the radiator mounting stay encloses an upper rear portion of the fuel cell.

10. The saddle riding type fuel cell vehicle according to claim 1, wherein upper portions of the radiators on the right and left sides of the fuel cell are connected by a distribution pipe which passes under a seat for a driver of the vehicle.

11. The saddle riding type fuel cell vehicle according to claim 1, further comprising:
    a slider provided on each side of the vehicle,
    wherein the sliders come in contact with a road surface when a vehicle bank angle exceeds a predetermined value, and the radiators are arranged above the sliders and closer to a vehicle body inner side.

12. The saddle riding type fuel cell vehicle according to claim 1, further comprising:
    a humidifier arranged adjacent to a front surface of the fuel cell.

13. The saddle riding type fuel cell vehicle according to claim 1, further comprising:
    an electric pump provided on a rear surface side of the fuel cell for pressure-feeding cooling water of the radiators; and
    an ion exchanger arranged under the electric pump.

14. The saddle riding type fuel cell vehicle according to claim 1, further comprising:
    a pair of right and left hydrogen cylinders provided on right and left sides of the head pipe in the vehicle width direction,
    wherein the hydrogen cylinders are arranged in an up and down direction along a main frame of the vehicle.

15. The saddle riding type fuel cell vehicle according to claim 1, further comprising:
   a seat on which a driver sits,
   where the fuel cell is provided under the seat with an inclination of a predetermined angle toward a vehicle body rear side.

16. The saddle riding type fuel cell vehicle according to claim 1, further comprising:
   a pair of hydrogen cylinders;
   a humidifier;
   an electric pump;
   an ion converter; and
   two rear wheels separated from each other in a vehicle width direction,
   wherein each of the radiators, the pair of hydrogen cylinders, the humidifier, the electric pump, and the ion exchanger is placed closer to a center of a body of the vehicle than an outer end surface of a corresponding one of each of the rear wheels in the vehicle width direction.

* * * * *